Oct. 13, 1931.　　　　S. J. FINN　　　　1,826,759
CONVEYING SYSTEM
Filed Jan. 5, 1927　　　3 Sheets-Sheet 2

Oct. 13, 1931.  S. J. FINN  1,826,759
CONVEYING SYSTEM
Filed Jan. 5, 1927  3 Sheets-Sheet 3

INVENTOR
Sidney J. Finn
By his Attorney,
Nelson W. Howard

Patented Oct. 13, 1931

1,826,759

UNITED STATES PATENT OFFICE

SIDNEY J. FINN, OF BEVERLY, MASSACHUSETTS, ASSIGNOR TO UNITED SHOE MACHINERY CORPORATION, OF PATERSON, NEW JERSEY, A CORPORATION OF NEW JERSEY

CONVEYING SYSTEM

Application filed January 5, 1927. Serial No. 159,133.

This invention relates to conveying systems, it being especially adapted for such purposes as the drying of coated articles, in connection with which it is a common practice to carry said articles for a considerable time upon a conveyor in order that the coating may harden before their delivery.

When, in certain manufacturing operations, as shoemaking, parts of the work are coated with cement, it is desirable to allow the applied adhesive to set partially, with the least possible disturbance to its surface, before utilization in succeeding operations. To this end, various types of conveyors are employed to carry the coated articles during the drying of the adhesive, and to deliver them at a convenient point. Such arrangements, so far as I am acquainted with them, are open to the objection that they occupy much space, which usually can ill be spared. An object of my invention is to obtain an extended conveyor-travel within a relatively small area.

For the attainment of this object, I employ, as a feature of the invention, an endless conveyor or conveyors, preferably constructed and arranged to support and retain articles upon their edges, together with novel means for guiding said conveyor in opposite spiral paths, these being shown herein as respectively descending and ascending. I prefer to employ for the support of the conveyor, which may be in the form of an endless belt, a series of pulleys or guide members rotatable in horizontal planes and a series rotatable in planes inclined to the horizontal. A spiral path is thus effectively produced by the receipt of the conveyor upon an inclined member from one of the horizontal members and its delivery to the succeeding horizontal member of the series. The conveying spirals occupy but small floor-space, and, since they may be extended to any reasonable height, they economically provide a long path for drying articles. By arranging the guide members or pulleys in two groups, each including the previously mentioned series, the conveying travel may not only be correspondingly increased, but the conveyor readily transferred from the upper to the lower level of the spirals, and the reverse, when the ends of the series are reached.

As a further feature of the invention, I employ a plurality of belts or conveying members, these traveling together over common pulleys or supports and having portions arranged to receive between them the conveyed articles. The receiving portions may consist of fingers or projections at the adjacent edges of the belts, these projections engaging opposite sides of the articles. To minimize the contact of the projections with the coated surfaces, and also the space occupied by the system, the conveyors are guided with their edges upmost. One or both of the series of projections may be offset, thus furnishing supports for the lower edges of the articles. To facilitate the introduction of the articles between the projections or other belt-portions which engage them, I furnish means for separating the conveying members from each other over a portion of their paths.

Since cementing machines by which the adhesive coating is applied usually deliver in a plane substantially at right angles to that in which the conveyor of the present invention advances the articles, there is interposed between these mechanisms, as another feature of the invention, means for receiving coated articles from the cementer, turning them through substantially ninety degrees, and delivering them to the conveyor. For this intermediate element, a quarter-turn belt may be employed.

A particular embodiment of the invention is illustrated in the accompanying drawings, in which Fig. 1 is a top plan view of my conveying system, the belt-fingers being omitted;

Figure 1:
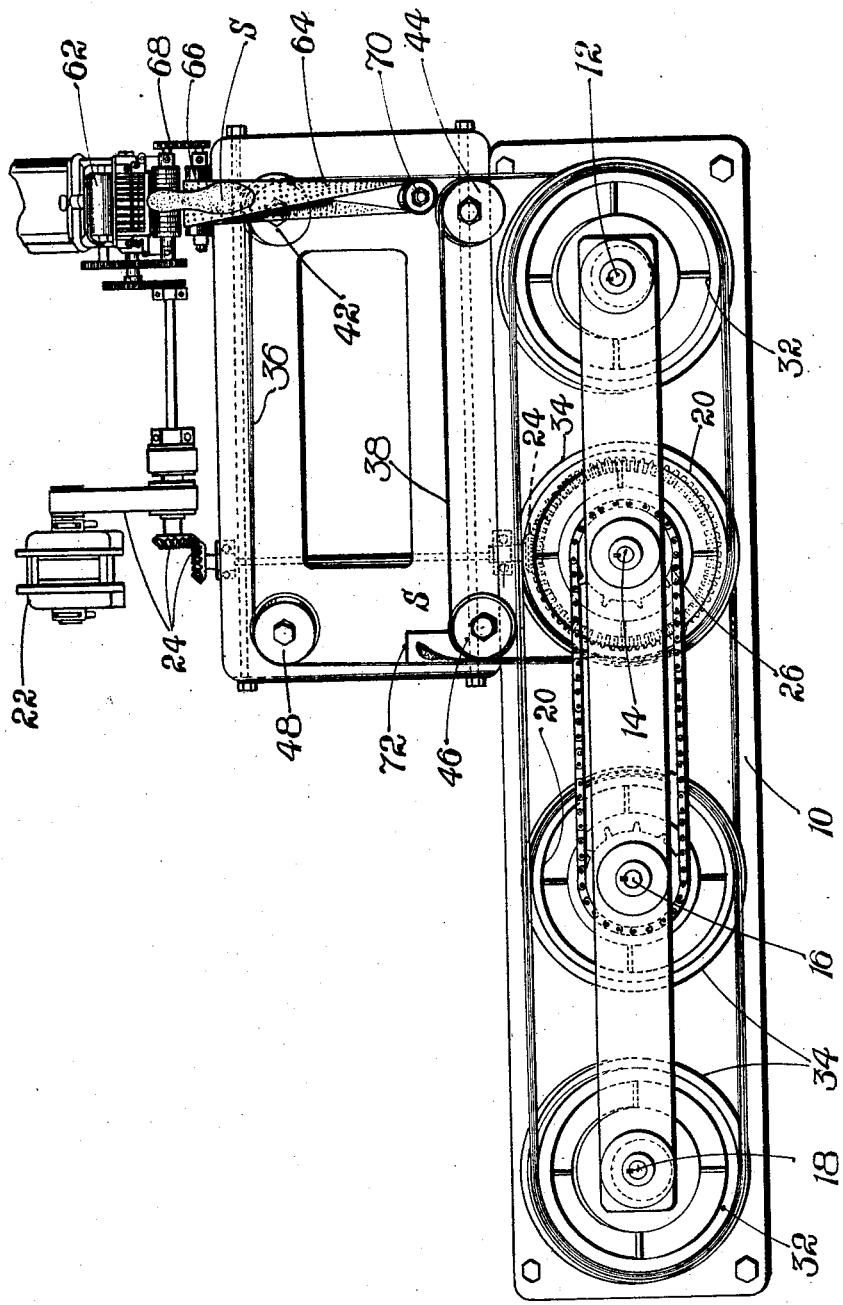
Figure 2:
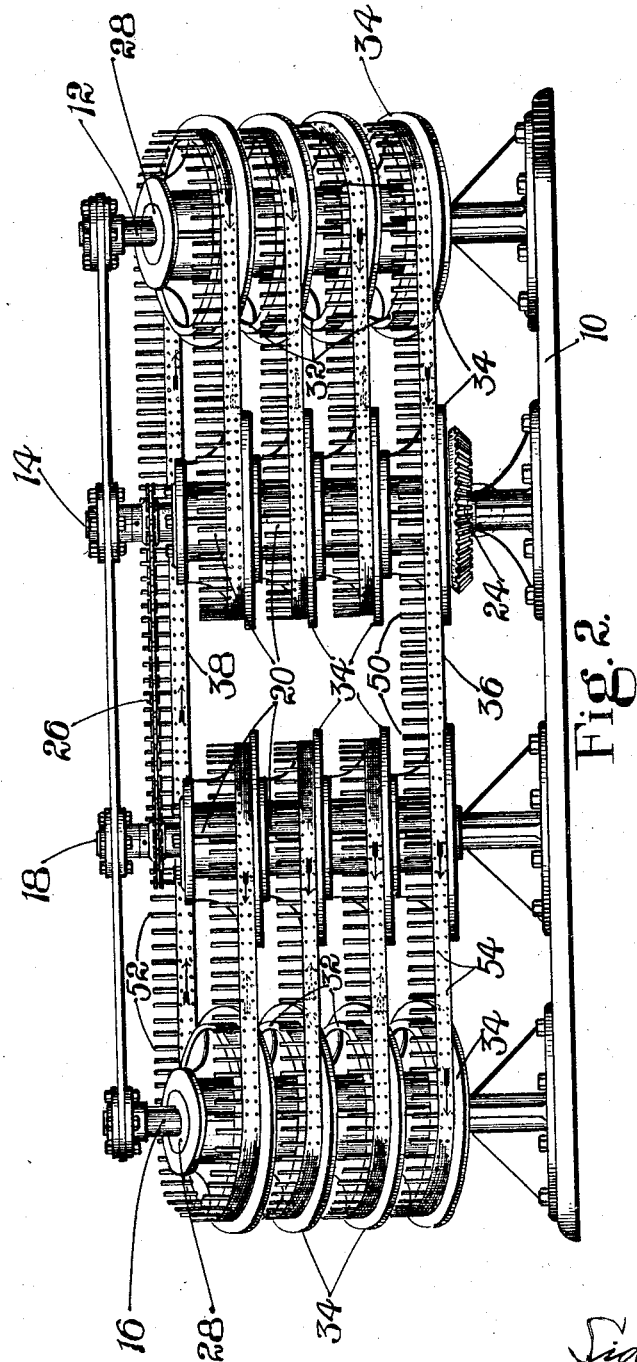
Fig. 2 is a front elevation thereof.
Figure 3:
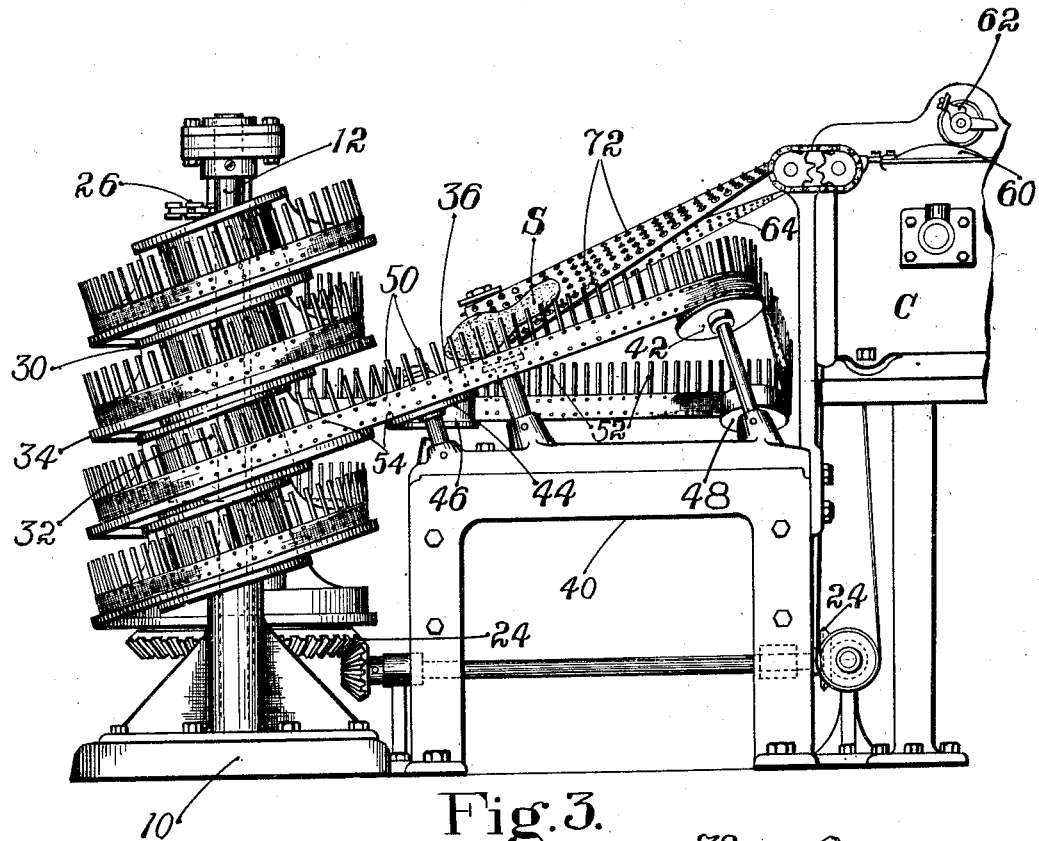
Fig. 3 shows the system in elevation, looking from the right in Fig. 2.

From a base 10 rise standards, of which four are shown, these being arranged in pairs 12, 14 and 16, 18, respectively. The pairs are preferably close to each other, while the distance between the standards of each pair may vary according to the extent of conveyor-travel desired in the space available. In these pairs or groups of standards, one of each has rotatable about it a series of pulleys 20, of which there may be four connected to turn together. They may be driven from a motor 22 through connections 24 to the series upon the standard 14, these, in turn, being geared at 26 to the series of he standard 18. Each series of pulles 20 has a common axis, so they turn in parallel horizontal planes. Splined upon each standard 12 and 16 is a series of eccentric bushings 28 having flanges 30 at their lower extremities, these bushings supporting pulleys 32 rotating about their exteriors. The eccentricity of each bushing is such and its axis is so inclined to the vertical, that at one side, as viewed in Fig. 2, each pulley 32, save the upper, is horizontally alined with a pulley 20 of the companion series, while the opposite side is correspondingly related to the next lower horizontal pulley. The upper edges of the top pulleys 32, 32 of the standards 12 and 16 lie in a horizontal plane above the pulleys 20, and are alined with each other. Each pulley of both groups has extending from its lower edge a peripheral flange 34.

Traveling in contact with each other about the pulleys 20 and 32, and retained from downward displacement by the flanges 34, are an outer endless conveyor-belt 36 and a like inner belt 38, the paths of which are traceable as follows: They may start separated from each other over a frame-portion 40, at which the articles to be conveyed are received and discharged. The vertical height of this starting point will depend upon the convenient relation of the delivering apparatus, as a cementing machine C. Inclined pulleys 42 and 44, rotatable upon the frame 40, respectively guide the belts into engagement at the outer side of one of the pulleys 32 of the series upon the standard 12 and in the direction of its inclination. Over this pulley 32, the belts together pass to the guiding surface of a pulley 20 upon the standard 14, which is horizontally alined with the lower edge of the receiving pulley 32, and about this to the upper edge of the next lower pulley 32, the course following a descending spiral. When the belts reach the bottom of the series in the pulley-group upon the standards 12 and 14, they travel outside the bottom pulley 20 upon standard 18, over the bottom pulley 32 upon standard 16, and then in an ascending spiral to the upper edge of the top pulley 32 upon standard 16. From here they return to the first group at the upper edge of the top pulley 32 upon standard 16, and run down the series to complete the descending spiral. When the horizontal pulley 20, alined with the upper edge of the starting pulley 32, is reached, the conveyor-belts separate from each other at the delivering point by being directed over pulleys 46 and 48 corresponding to the pulleys 42 and 44 at the receiving side.

Figure 4:
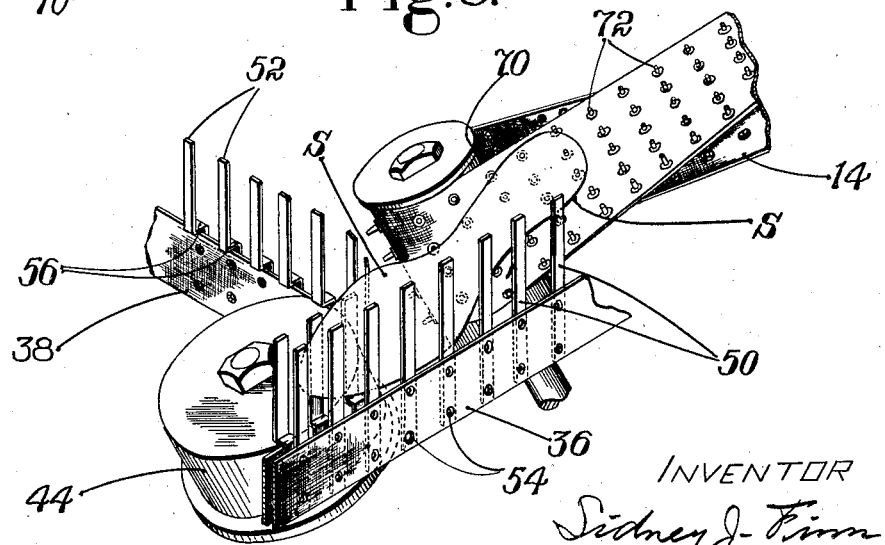
Fig. 4 is a detail in perspective of the point of delivery of the transferring belt to the main conveying belts.

Conveyors thus arranged are adapted to carry articles between them from the receiving point to the delivering point. Since this system is particularly designed for the drying of freshly coated objects, and as the contact of a conveyor-belt with the coated surface would be objectionable, each of the belts 36 and 38 is provided at its upper edge with a continuous series of fingers or projections 50 and 52, respectively, which may be secured in place by rivets 54. These fingers are of sufficient height to hold the conveyed articles against lateral displacement. To give a space between the series of fingers to admit the articles and to carry any drip from the coated articles away from the contacting belt-surfaces, the fingers of at least one of the series may be offset, as is indicated at 56 in Fig. 4, giving angular portions which extend over the side of the belt opposite the companion belt.

The cementing machine C previously mentioned may be of that well-known type in which the work-advancing rolls, as the applying roll 60 and the pressure-roll 62, rotate about horizontal axes, the former being shown as driven from the motor 22, so the coated articles are delivered in a horizontal plane. Because my improved conveying system is preferably organized to advance articles while they stand upon their edges in vertical planes, I interpose between the cementer and conveyor a device which changes the angle of the articles. This is shown as a quarter-turn belt 64. One of the guiding pulleys 66 of this belt, through which it may also be driven, turns about a horizontal axis adjacent to the cementing machine, from which it may receive power through gearing 68. The other pulley 70 of the belt 64 is mounted to turn upon the frame 40 close to the pulley 44 of the conveyors 36 and 38. Its shaft is shown as inclined toward the meeting point of these drying conveyors, so it delivers the cemented articles upon their edges in a vertical plane between the projections 50 and 52 and resting upon the offsets 56. To minimize the disturbance of the coating applied by the roll 60, the work-carrying surface of the transferring or turning belt may be provided with studs or projections 72, upon the ends only of which the coated articles rest.

Assuming that the system is to be applied to the drying of a coating of cement upon insoles S, these, as they emerge from a cementing machine, are discharged upon the belt 64 lying in a horizontal plane, are turned by said belt through substantially ninety degrees, and are deposited at the pulley 44 upon the offset portions of the projections 52 rising from the conveyor 38, with the projections 50 of the conveyor 36 at their opposite sides. The contact of the coated surfaces with these conveyors 36 and 38 is limited to small separated areas at the upper extremities of one of the sets of projections. The insoles travel with the conveyors alternately over the inclined and horizontal pulleys of the descending spiral in the first group of guiding pulleys, and then to the second group, in which they ascend to the top and are returned to the first group, completing the descent to the pulley 46. Here, as the conveyors 36 and 38 separate, the insoles, now dried by their extended travel, fall through an opening 72 in the frame 40 into a receptacle. To meet the requirements of any particular work, the length of the conveying path may be changed either by separating the standards of the pairs 12, 14 and 16, 18, if the floor-space is available, or, if more convenient, by increasing the height of the standards with the number of pulleys thereon, and therefore the convolutions of the spirals.

Having described my invention, what I claim as new and desire to secure by Letters Patent of the United States is:

1. In a conveying system, an endless conveyor constructed and arranged to support flat articles upon their edges, means for retaining the articles in co-operation with the conveyor, means for guiding the conveyor in an ascending spiral, means spaced from said guiding means for guiding the conveyor in a descending spiral, and means for delivering articles edge-down into co-operation with the retaining means at one of the spirals.

2. In a conveying system, a plurality of endless conveyors, and means arranged to guide said conveyors in contact with each other in opposite spiral paths.

3. In a conveying system, two conveyor-belts, pulleys arranged to guide said belts in contact with each other in an ascending spiral, and pulleys arranged to guide said belts in a descending spiral.

4. In a conveying system, a plurality of endless conveyors, means arranged to guide said conveyors in opposite spiral paths, and projections extending from the conveyors, the projections upon different conveyors being arranged to engage the opposite sides of conveyed articles.

5. In a conveying system, two conveyor-belts, pulleys arranged to guide said belts in contact with each other in an ascending spiral, pulleys arranged to guide said belts in a descending spiral, and article-engaging projections extending from adjacent edges of both conveyors.

6. In a conveying system, a plurality of endless conveyors, means arranged to guide said conveyors in contact with each other in opposite spiral paths, and means arranged to separate the conveyors from one another over a portion of their paths.

7. In a conveying system, two conveyor-belts, pulleys arranged to guide said belts in contact with each other in an ascending spiral, pulleys arranged to guide said belts in a descending spiral, and pulleys arranged to separate the belts to facilitate the introduction of articles to be conveyed.

8. In a conveying system, a frame including a base, a standard rising therefrom, a series of pulleys rotatable about the standard in horizontal planes, a second standard rising from the base, both standards being free from the frame at their upper extremities, pulleys rotatable about said second standard in planes inclined to the horizontal, and a conveyor running alternately over the pulleys of the two series.

9. In a conveying system, a standard, a series of pulleys rotatable about the standard, a second standard, a series of eccentric bushings thereon having their axes inclined with respect to the axis of their supporting standard, a series of pulleys rotatable about the bushings, and a conveyor-belt running alternately over the pulleys of the two series.

10. In a conveying system, a series of guide members rotatable in horizontal planes, a series of guide members rotatable in planes inclined to the horizontal, and two conveyors running in contact with each other alternately over the members of the two series.

11. In a conveying system, two groups of guide members spaced from each other, each group consisting of a series of members rotatable in horizontal planes and a series of members rotatable in planes inclined to the horizontal, two conveyors running in contact with each other over members of the series of each group and from group to group, and means arranged to separate the conveyors from each other adjacent to one of the groups.

12. In a conveying system, a series of guide members rotatable in horizontal planes, a series of guide members rotatable in planes inclined to the horizontal, and two conveyors running in contact with each other alternately over the members of the two series, each of said conveyors having at adjacent edges article-engaging projections.

13. In a conveying system, a plurality of rotatable supports, and a plurality of endless members traveling together over the same supports and having portions extending beyond their edges and arranged to there receive between them articles to be conveyed.

14. In a conveying system, a plurality of rotatable supports, a plurality of endless members traveling together over the same supports in contact with one another, means for separating the contacting members over a portion of their paths, and means for delivering articles to the conveyors at the separated portions.

15. In a conveying system, a plurality of rotatable supports, and a plurality of endless members traveling over the supports and provided at adjacent edges with projections, the projections of one member being separated from those of another to furnish a receiving space for conveyed articles.

16. In a conveying system, a plurality of rotatable supports, and a plurality of endless members traveling over the supports and provided at adjacent edges with projections, the projections upon a member being offset therefrom.

17. In a conveying system, a plurality of pulleys, two belts running in contact with each other over the same pulleys, and article-supporting fingers carried by the belts.

18. In a conveying system, a plurality of pulleys, two belts running in contact with each other over the same pulleys, and article-supporting fingers carried by the belts, the fingers of one belt having angular portions extending at one side of said belt.

19. In a conveying system, a plurality of co-operating conveyors, supports common to the conveyors and arranged to guide them with their edges upmost, and means arranged to deliver articles to the conveyors at such upper edges.

20. In a conveying system, a plurality of pulleys, belts guided by the pulleys, and upwardly extending fingers projecting from the edges of the belts and arranged to receive between them articles to be conveyed.

21. In a conveying system, a plurality of pulleys, two belts running in contact with each other over the pulleys with their edges upmost, and article-engaging fingers projecting from the edges of the belts.

22. The combination of a conveyor arranged to advance articles resting on their edges, and means constructed and arranged to receive coated articles from a cementing machine, turn them through substantially 90° and deliver them to the conveyor.

23. The combination of a conveyor-belt arranged to travel with its edge uppermost, and a belt arranged to receive horizontally disposed coated articles from a cementing machine and to deliver said articles to the edge of the conveyor-belt.

24. The combination of co-operating conveyor-belts provided at their edges with article-engaging projections, and a quarter-turn belt arranged to receive articles from a cementing machine and deliver them between the projections.

In testimony whereof I have signed my name to this specification.

SIDNEY J. FINN.